United States Patent [19]
Chmiel

[11] Patent Number: 5,892,341
[45] Date of Patent: Apr. 6, 1999

[54] QUICK SET ELECTRIC MOTOR BRAKE CONTROL

[75] Inventor: Steven F. Chmiel, Cudahy, Wis.

[73] Assignee: Rexnord Corporation, Milwaukee, Wis.

[21] Appl. No.: 959,911

[22] Filed: Oct. 29, 1997

[51] Int. Cl.$^6$ ..................................................... H02K 7/10
[52] U.S. Cl. .......................... 318/362; 318/375; 318/757; 318/759
[58] Field of Search ........................ 318/92–96, 101–104, 318/362, 375, 757, 758, 759

[56] References Cited

U.S. PATENT DOCUMENTS

| | | |
|---|---|---|
| 4,798,269 | 1/1989 | Lindner et al. . |
| 5,186,287 | 2/1993 | Lindner et al. . |
| 5,421,436 | 6/1995 | Lindner et al. . |
| 5,620,065 | 4/1997 | Baker et al. . |

Primary Examiner—William M. Shoop, Jr.
Assistant Examiner—Rina Ivonne Duda
Attorney, Agent, or Firm—Andrus, Sceales, Starke & Sawall

[57] ABSTRACT

A control circuit (10) is provided for an electric motor brake (12) having an electromagnetic brake coil (14) energizable to actuate the brake to a released condition permitting rotation of an electric motor (16), and de-energizable to enable actuation of the brake setting the brake to a braking condition stopping rotation of the motor. The control circuit includes a switch (102) having an on state energizing the brake coil, and an off state de-energizing the brake coil. A discriminating trigger circuit (76 et al) responds to voltage across the motor to trigger the switch between its on and off states, and discriminates between increasing and decreasing motor voltage during energization and de-energization, respectively, of the motor, to trigger the switch to its on state at a first motor voltage, and to trigger the switch to its off state at a second motor voltage higher than the first motor voltage, to compensate for voltage generated by continuing inertia-rotation of the motor following de-energization thereof otherwise delaying actuation of the brake. The triggering of the switch to its off state at the second motor voltage enables faster application of the brake and stopping of the motor. The same switch both energizes and de-energizes the brake coil, without a separate relay for de-energizing the brake coil.

13 Claims, 2 Drawing Sheets

QUICK SET ELECTRIC MOTOR BRAKE CONTROL

The invention relates to electric motor brakes, and more particularly to a brake control facilitating quick setting of the brake.

Electric motor brakes are known in the prior art, for example as shown in U.S. Pat. Nos. 4,798,269, 5,186,287, 5,421,436, 5,620,065, and allowed U.S. application Ser. No. 08/672,248, filed Jun. 28, 1996, all incorporated herein by reference. The electric motor brake has an electromagnetic brake coil energizable to actuate the brake to a released condition permitting rotation of the electric motor, and de-energizable to enable actuation of the brake to a braking condition, e.g. by one or more biasing springs, stopping rotation of the motor. A friction disc is typically keyed to the rotary output shaft of the electric motor. Energization of the brake coil, e.g. a solenoid, attracts an armature toward a pole face and against the bias of the biasing springs, to release the friction disc and permit rotation thereof by the motor shaft. De-energization of the brake coil releases the armature from the pole face, and the springs bias the armature against the friction disc to in turn push the friction disc against a stationary pressure plate, to stop rotation of the disc and hence stop rotation of the motor shaft, all as is known.

In applying line voltage to the motor, it is typical to also apply the line voltage to the brake coil to energize the latter to release the brake, permitting rotation of the electric motor. Upon de-energization of the motor by removing line voltage therefrom, the motor will begin to decelerate. The rate of deceleration depends on the amount of inertial loading of the motor. During this continuing inertia-rotation, the motor acts as a generator and generates voltage, which voltage continues to supply some energization current to the brake coil, which tends to hold the armature against the pole face and delay release thereof, hence delaying actuation or setting of the brake to a braking condition, whereby the motor runs-on longer than desired even after de-energization thereof.

In order to stop rotation of the motor as quickly as possible following de-energization thereof, it is known in the prior art to provide a separate relay for the brake coil, in addition to the motor starter. The relay is opened upon de-energization of the motor, to terminate brake coil current, and hence allow faster actuation of the brake to a braking condition, i.e. quicker setting of the brake, to stop rotation of the motor. An objection to this is the extra expense of the relay. Another objection is the wiring expense, inconvenience, and installation cost, because the motor and the brake may be hundreds of feet from the AC power line, motor starter, and DC power supply for the brake coil.

The present invention addresses and solves the above noted problem in a particularly simple and cost effective manner. The present invention provides a quick set brake, without a separate relay for de-energizing the brake coil. The present invention provides a control circuit having a switch, preferably a field effect transistor, FET, connected in series with the brake coil. The series combination of the switch and the brake coil is connected in parallel across the motor. The switch has a conductive on state energizing the brake coil, and a nonconductive off state de-energizing the brake coil. The same switch both energizes and de-energizes the brake coil. The switch is triggered between on and off states by motor voltage. The control circuit includes a discriminating trigger circuit differentially responding to motor voltage during energization and de-energization, respectively, of the motor, to trigger the switch between the on and off states at different values of the motor voltage as it increases and then decreases upon energization and then de-energization, respectively, of the motor. In the preferred embodiment, the switch is triggered to the on state at a first motor voltage value during increasing motor voltage upon energization of the motor, and the switch is triggered to the off state at a second motor voltage value during decreasing motor voltage upon de-energization of the motor, the second motor voltage value being higher than the first motor voltage value.

DETAILED DESCRIPTION OF THE INVENTION

Figure 1:
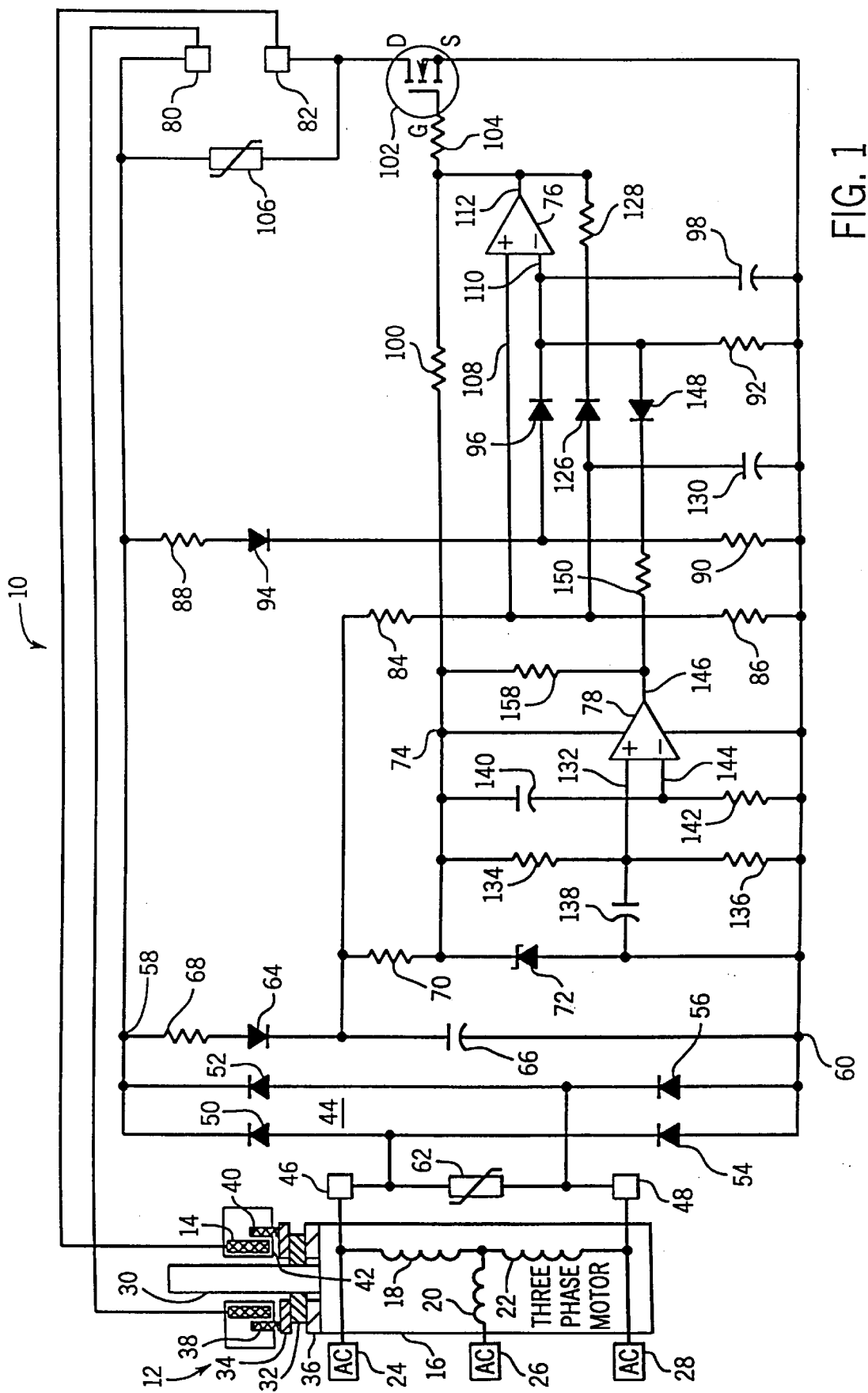
FIG. 1 is a circuit diagram of an electric motor brake control circuit in accordance with the invention.

FIG. 1 shows an electric motor brake control circuit 10 for an electric motor brake 12, shown schematically, having an electromagnetic brake coil 14 energizable to actuate the brake to a released condition permitting rotation of an electric motor 16, and de-energizable to enable actuation of the brake to a braking condition stopping rotation of the motor. The motor shown is a three phase electric motor, with the three phase windings illustrated at 18, 20, 22, energizable by AC line voltage at terminals 24, 26, 28. The motor has a rotary output shaft 30. The brake is normally in a set or braking condition stopping rotation of the motor. A friction disc 32 is keyed to and rotates with shaft 30. The friction disc is normally pushed by an axially movable armature 34 against a stationary pressure plate 36 which is mounted on the end face of the motor. Armature 34 may be pushed against friction disc 32 by biasing springs such as 38, 40, to provide what is commonly called a spring set brake, or may be biased by other means, mechanical or electrical. The brake is actuated to a released condition, permitting rotation of the electric motor, by energizing brake coil 14, which in turn creates a magnetic flux field pulling armature 34 toward and against pole face 42, against the bias of springs 38, 40. This releases friction disc 32 from engagement with pressure plate 36, to in turn enable rotation of friction disc 32 and motor shaft 30. The above described structure and operation is known in the prior art, and hence is only schematically shown. Further reference may be had to the above noted incorporated patents.

Circuit 10 includes a full wave diode bridge rectifier 44 connected to motor terminals 46, 48, including diodes 50, 52, 54, 56, providing a DC output at bridge rectifier output terminals 58, 60. The diodes of the bridge rectifier are protected from transient overvoltage by metal oxide varister, MOV, 62.

Diode 64, capacitor 66, resistors 68, 70, and zener diode 72 provide a regulated power supply supplying regulated voltage at terminal 74 for a dual comparator integrated circuit, provided by an LM393N voltage comparator or equivalent, having a first comparator 76 and a second comparator 78. Resistor 68 provides current limiting for diode 64. Diode 64 prevents discharge of capacitor 66 through the load impedance of brake coil 14 connected to terminals 80 and 82 of the control circuit. Resistor 70 provides current limiting for zener diode 72.

Diode 64, resistors 68, 84, 86, and capacitor 66 form a filter network selected to have a relatively fast charge and discharge time constant. Resistors 88, 90, 92, diodes 94, 96, and capacitor 98, form a filter network selected to have a relatively slow charge time constant and a very slow discharge time constant.

Resistor 100 provides gate voltage from power supply terminal 74 to metal oxide semiconductor field effect transistor, MOSFET, 102, provided by an IRF830/IRF840 or equivalent. Resistor 104 protects the output of comparator 76 from the current impulse which results from discharging the energy stored in MOSFET 102 gate to source capacitance. MOV 106 protects MOSFET 102 from transient overvoltage generated by switching the load inductance of brake coil 14.

Figure 2:
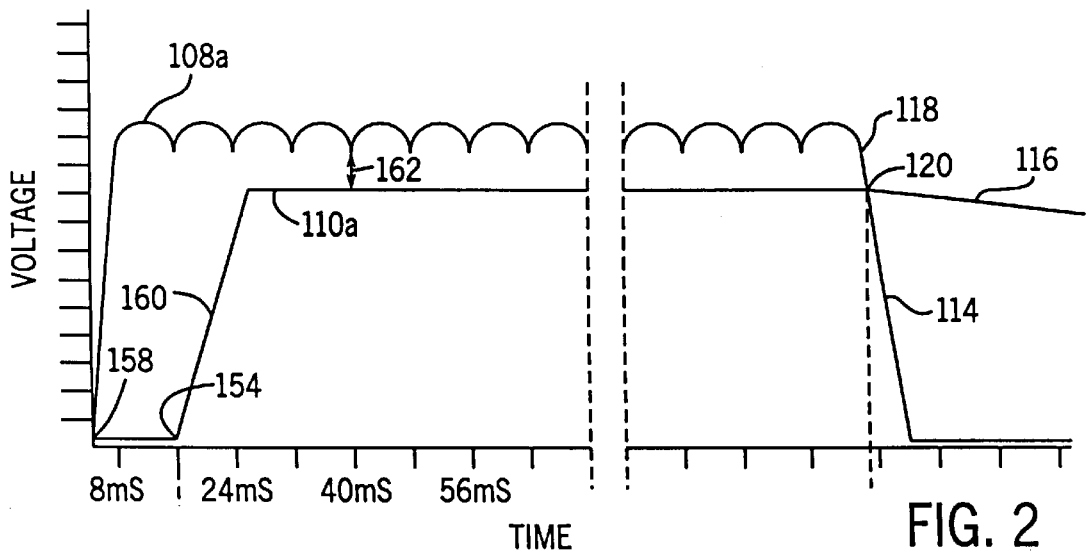
FIG. 2 is a waveform diagram illustrating operation of the circuit of FIG. 1.

Upon application of power to motor 16 and circuit 10 at AC terminals 24, 26, 28, the fast RC circuit voltage applied to noninverting input 108 of comparator 76 will quickly rise to a voltage level proportional to the instantaneous value of the supply voltage, as shown at waveform 108a in FIG. 2. The slow RC circuit voltage applied to the inverting input 110 of comparator 76 will rise to a voltage level proportional to the value of the supply voltage, but at a much slower rate, as shown at waveform 10a in FIG. 2. Resistors 86 and 90 are selected such that during energized running of the motor the voltage at comparator input 108 is higher than the voltage at comparator input 110, as illustrated in FIG. 2. At initial energization of the motor, the voltage at input 108 substantially instantaneously rises above the voltage at input 110, FIG. 2, and the output 112 of comparator 76 goes high, gating MOSFET 102 into conduction, to in turn complete a circuit through brake coil 14, applying DC power to the brake coil substantially simultaneously with the application of power to motor 16. Thus, brake 12 is actuated to the noted released condition to release the motor without delay.

Upon disconnection of motor 16 and circuit 10, i.e. disconnection of line voltage from terminals 24, 26, 28, the motor-generated voltage will decay at a rate proportional to the rate of deceleration of the motor, dependent upon individual motor electrical and magnetic properties. It is this decaying motor-generated voltage that prevents quick and timely setting of brake 12, particularly in highly inertial load applications. The fast RC circuit voltage applied to comparator input 108 decays at a rate nearly the same as that of the motor voltage, as shown at 114, FIG. 2. The slow RC circuit voltage applied to comparator input 110 discharges at a much slower rate, as shown at 116 in FIG. 2. Thus, shortly after disconnection of power to the motor, as shown at 118 in FIG. 2, the voltage at comparator input 108 will quickly decrease below the voltage at comparator input 110, as shown at cross-over 120 in FIG. 2, causing comparator output 112 to transition low, to trigger MOSFET 102 off, switching brake coil 14 out of the motor circuit, as shown at 122 in FIG. 3 for waveform 112a of comparator output 112, and as shown at 124 in FIG. 4 for waveform 14a of current through brake coil 14.

Diode 126 and resistor 128 provide hysteresis for comparator 76. Diode 126 blocks the regulated power supply voltage present at comparator output 112, as supplied from terminal 74 through resistor 100, from affecting the voltage level at comparator input 108. Capacitor 130 provides noise bypass and stabilization.

Figure 3:
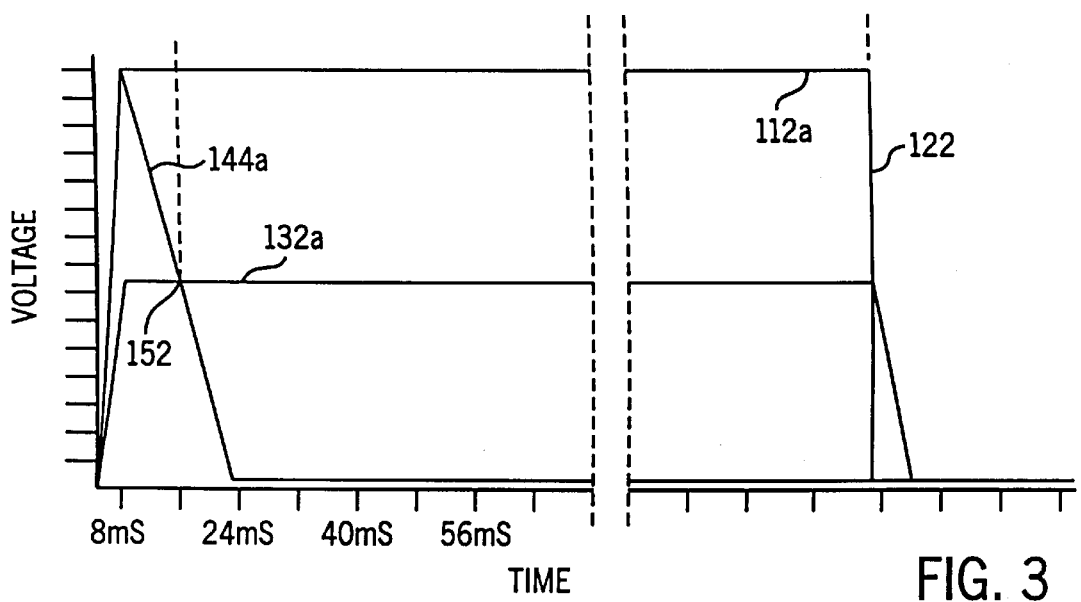
FIG. 3 is a waveform diagram illustrating operation of the circuit of FIG. 1.
Figure 4:
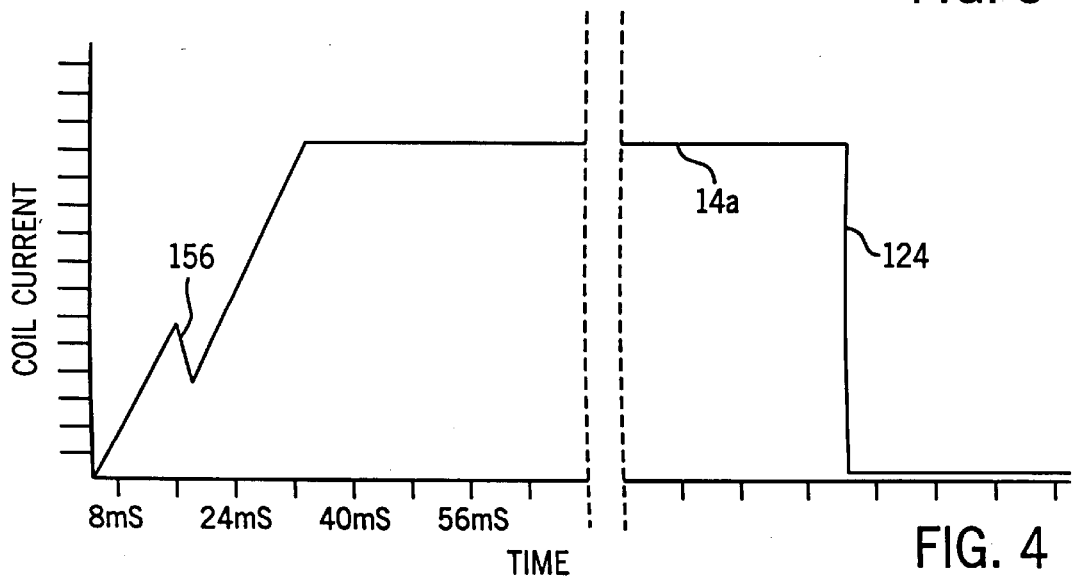
FIG. 4 is a waveform diagram illustrating operation of the circuit of FIG. 1.

Comparator 78 provides a reset function, to ensure release of the brake upon energization of the motor, even if the motor is energized only a short time after de-energization thereof. A reference voltage of half the regulated supply voltage at terminal 74 is supplied to noninverting input 132 of comparator 78 by the voltage divider provided by resistors 134, 136. Capacitor 138 provides noise bypass and stabilization. The reference voltage at comparator input 132 is shown at voltage waveform 132a in FIG. 3. Upon application of power to the motor, i.e. energization of the motor by applying line voltage at terminals 24, 26, 28, a pulse of current flows through capacitor 140, developing a pulse voltage across resistor 142 at inverting input 144 of comparator 78, as shown at waveform 144a, FIG. 3, which is more positive than the voltage at comparator input 132 for the duration of the pulse charge. During this interval, the output 146 of comparator 78 transitions low, which in turn discharges capacitor 98 of the slow RC circuit through diode 148 and resistor 150. At the end of the charge pulse interval, i.e. when the voltage at comparator input 144 decreases below the voltage at comparator input 132, as shown at 152, FIG. 3, comparator output 146 transitions high, and the slow RC circuit begins charging, as shown at 154, FIG. 2. The momentary decrease in brake coil current 14a, as shown at 156, FIG. 4, indicates that the brake air gap has closed, i.e. the gap between armature 34 and pole face 42 has closed, modifying the circuit inductance and hence the current rise time. Diode 148 prevents the regulated power supply voltage from affecting the reference voltage at comparator input 110. Resistor 158 is a pull-up resistor for comparator output 146.

In the preferred embodiment, for 230 volt AC line voltage at terminals 24, 26, 28, the circuit values are as follows: brake coil voltage at bridge rectifier output terminals 58 and 60 across terminals 80 and 82 of brake coil 14 is 207 volts DC; resistor 68 is 47 ohms; resistor 70 is 75 kilohms; resistor 134 is 1 megohm; resistor 136 is 1 megohm; resistor 142 is 1 megohm; resistor 158 is 100 kilohms; resistor 84 is 1 megohm; resistor 86 is 30.9 kilohms; resistor 88 is 1 megohm; resistor 90 is 21 kilohms; resistor 92 is 10 megohms; resistor 100 is 100 kilohms; resistor 104 is 15 ohms; resistor 150 is 15 ohms; resistor 128 is 56.2 kilohms; capacitor 66 is 0.33 microfarads; capacitor 140 is 0.01 microfarad; capacitor 138 is 0.01 microfarads; capacitor 98 is 1.5 microfarads; capacitor 130 is 470 picofarads.

The invention thus provides an electric motor brake control circuit 10 for an electric motor brake 12 having an electromagnetic brake coil 14 energizable to actuate the brake to a released condition permitting rotation of motor shaft 30 of electric motor 16, and de-energizable to enable actuation of the brake, e.g. by springs 38, 40 or other means, setting the brake to a braking condition stopping rotation of the motor. Control circuit 10 includes a switch provided by MOSFET 102 connected in series with brake coil 14. The series combination of switch 102 and brake coil 14 is connected in parallel across motor 16. Switch 102 has a conductive on state energizing brake coil 14, and has a nonconductive off state de-energizing brake coil 14. The same switch 102 both energizes and de-energizes brake coil 14, without a separate relay for de-energizing brake coil 14.

Switch 102 is triggered between its on and off states by motor voltage. Control circuit 10 includes a discriminating trigger circuit 76 et al responding to motor voltage during energization and de-energization, respectively, of motor 16, to trigger switch 102 between its on and off states at different motor voltage values, FIG. 2, during increasing and decreasing motor voltages upon energization and de-energization, respectively, of motor 16. Switch 102 is triggered to its on state at a first motor voltage value 158, FIG. 2, during increasing motor voltage upon energization of motor 16. Switch 102 is triggered to its off state at a second motor voltage value 120 during decreasing motor voltage upon de-energization of motor 16. The noted second motor voltage value 120 is higher than the first motor voltage value 158.

Discriminating trigger circuit 76 et al responds to voltage across motor 16 to trigger switch 102 between its on and off states, and discriminates between increasing and decreasing motor voltage during energization and de-energization, respectively, of motor 16, to trigger switch 102 to its on state at the noted first motor voltage, and to trigger switch 102 to its off state at the noted second motor voltage higher than the first motor voltage. This compensates for voltage generated by continuing inertia-rotation of motor 16 following de-energization thereof, which otherwise delays actuation or setting of brake 12. The triggering of switch 102 to its off state at the second motor voltage 120 enables faster application of brake 12 and stopping of motor shaft 30 of motor 16. The noted RC circuit combination provides a shiftable reference circuit providing a first reference voltage value 158 upon energization of motor 16, and a second reference voltage value 120 upon de-energization of the motor. Switch 102 is triggered to its on state when motor voltage rises above the first motor voltage relative to the first reference voltage value, and switch 102 is triggered to its off state when motor voltage decreases below the second motor voltage relative to the second reference voltage value, the second reference voltage being higher than the first reference voltage. The voltage provided by the shiftable reference circuit increases from the first reference voltage value to the second reference voltage value during energization of the motor, as shown at waveform 110a, FIG. 2. Motor voltage rises faster than and reaches a higher level than the second reference voltage value during energization of the motor, as shown at waveforms 108a and 110a, FIG. 2. The voltage provided by the shiftable reference circuit decreases from the second reference voltage value to the first reference voltage value upon de-energization of the motor at a slower rate 116, FIG. 2, than the rise 160 from the first reference voltage value to the second reference voltage value upon energization of the motor. Motor voltage decreases at a faster rate 114 than the noted decrease 116, to provide the cross-over 120 shortly after de-energization of the motor at 118, without further delay due to continued generation of back EMF by the motor as it continues to rotate as it decelerates, particularly if highly inertially loaded. The reset circuit provided by comparator 78 et al is coupled to the shiftable reference circuit provided by the noted fast and slow RC circuits and is responsive to energization of motor 16 to rapidly shift the voltage of the reference circuit to the noted first reference voltage value, as shown during the pulse charge interval between 158 and 154 in FIG. 2, and at 144a in FIG. 3, even if the voltage of the reference circuit is still decreasing at 116, FIG. 2, from the second reference voltage value to the first reference voltage value. This enables substantially instantaneous starting of motor 16 even if the motor is energized only a short time after de-energization thereof.

Comparator 76 has an output 112 controlling switch 102, and has the noted pair of RC charging circuits include in combination the noted fast RC circuit 64, 68, 84, 86, 66, and the noted slow RC circuit 88, 90, 92, 94, 96, 98, each charged by motor voltage. The fast RC circuit charges faster than the slow RC circuit, as shown in FIG. 2 at 108a and 110a, respectively. The fast RC circuit is coupled to comparator input 108. The slow RC circuit is coupled to comparator input 110. Upon energization of motor 16, the fast RC circuit charges more rapidly than the slow RC circuit, and the fast RC circuit in turn rapidly charges the voltage 108a at comparator input 108 above the voltage 110a at comparator input 110 such that the output 112 of comparator 76 triggers switch 102 to its on state to energize brake coil 14 to actuate brake 12 to its released condition permitting rotation of the motor. Upon de-energization of the motor, the fast RC circuit discharges more rapidly than the slow RC circuit, as shown in FIG. 2 at 114 and 116, respectively, and in turn the fast RC circuit rapidly discharges the voltage at comparator input 108 below the voltage at comparator input 110, as shown at cross-over 120, FIG. 2, even while motor 16 is still generating voltage during continued inertia-rotation thereof. The discharging of the voltage at comparator input 108 below the voltage at comparator input 110 causes the output 112 of comparator 76 to trigger switch 102 to its off state to de-energize brake coil 14 to enable actuation of brake 12, e.g. by springs 38, 40, or otherwise, setting the brake to its noted braking condition stopping further rotation of motor shaft 30 of motor 16, without waiting for further decrease in voltage generated by the motor.

The noted fast RC circuit includes a voltage divider provided by resistors 84, 86 coupled thereto and limiting the voltage at comparator input 108 to a first value relative to motor voltage, as shown at 108a in FIG. 2. The noted slow RC circuit includes a voltage divider provided by resistors 88, 90 coupled thereto and limiting the voltage at comparator input 110 to a second value relative to motor voltage, as shown at 110a, FIG. 2. The noted second value is less than the noted first value by a difference 162. Upon energization of motor 16, the voltage at comparator input 108 rises faster than and reaches a higher level than the voltage at comparator input 110, as above described. The noted first and second values are sufficiently spaced, 162, FIG. 2, such that during energized running of the motor, the voltage at comparator input 108 remains above the voltage at comparator input 110 and does not drop to the latter during normal transient dips in line voltage applied to motor 16. Upon de-energization of the motor, the voltage at comparator input 108 drops faster than and crosses below, 120, FIG. 2, the voltage at comparator input 110.

The reset circuit provided by comparator 78 et al is coupled to the noted slow RC circuit and responds to energization of motor 16 to rapidly discharge the slow RC circuit in the event there is still voltage stored therein, to enable rapid triggering of switch 102 to its on state and quick release of brake 12 upon energization of motor 16, even if motor 16 is energized only a short time after de-energization thereof. Output 146 of comparator 78 of the reset circuit is coupled to the slow RC circuit. Noninverting input 132 of comparator 78 is coupled to the fast RC circuit. Inverting input 144 of comparator 78 is coupled to pulse charge circuit 140, 142 responsive to motor voltage. Upon energization of motor 16, the pulse charge circuit momentarily charges the voltage at comparator input 144, as shown at 144a, FIG. 3, above the voltage at comparator input 132, such that comparator output 146 transitions low and discharges the slow RC circuit. The pulse charge circuit supplies only a momentary charge to comparator input 144 during energization of the motor, such that the voltage at comparator input 144 at the end of the momentary charge drops below, 152, FIG. 3, the voltage at comparator input 132, all during energization of the motor, such that comparator output 146 transitions high and stops discharging the slow RC circuit, whereupon the slow RC circuit begins charging, 154, FIG. 2, to in turn provide increasing voltage 160, FIG. 2, at inverting input 110 of comparator 76. The rise 154, FIG. 2, in voltage at comparator input 110 is delayed relative to the rise 158 in voltage at comparator input 108 by the length of time which the voltage 144a, FIG. 3, at comparator input 144 is above the voltage 132a at comparator input 132, which in turn is controlled by the momentary charge provided by pulse charge circuit 140, 142. Diode 148 and resistor 150 are connected in series between comparator output 146 and the slow RC circuit at comparator input 110 connected to capacitor 98. Diode 148 enables discharging current flow therethrough from capacitor 98 of the slow RC circuit, and blocks reverse charging current therethrough to the slow RC circuit.

It is recognized that various equivalents, alternatives and modifications are possible within the scope of the appended claims.

I claim:

1. In an electric motor brake having an electromagnetic brake coil energizable to actuate the brake to a released condition permitting rotation of an electric motor, and de-energizable to enable actuation of the brake setting the brake to a braking condition stopping rotation of the motor, a control circuit comprising a switch connected in series with said brake coil, the series combination of said switch and said brake coil connected in parallel across said motor, said switch having a conductive on state energizing said brake coil, said switch having a nonconductive off state de-energizing said brake coil, the same said switch both energizing and de-energizing said brake coil without a separate relay for de-energizing said brake coil.

2. The electric motor brake control circuit according to claim 1 wherein said switch is triggered between said on and off states by motor voltage, said control circuit comprising a discriminating trigger circuit differentially responding to motor voltage during energization and de-energization, respectively, of said motor, to trigger said switch between said on and off states at different motor voltage values during increasing and decreasing motor voltages upon energization and de-energization, respectively, of said motor.

3. The electric motor brake control circuit according to claim 2 wherein said switch is triggered to said on state at a first motor voltage value during increasing motor voltage upon energization of said motor, and said switch is triggered to said off state at a second motor voltage value during decreasing motor voltage upon de-energization of said motor, said second motor voltage value being higher than said first motor voltage value.

4. In an electric motor brake having an electromagnetic brake coil energizable to actuate the brake to a released condition permitting rotation of an electric motor, and de-energizable to enable actuation of the brake setting the brake to a braking condition stopping rotation of the motor, a control circuit comprising a switch having an on state energizing said brake coil, and an off state de-energizing said brake coil, a discriminating trigger circuit responsive to voltage across said motor to trigger said switch between on and off states and discriminating between increasing and decreasing motor voltage during energization and de-energization, respectively, of said motor, to trigger said switch to said on state at a first motor voltage, and to trigger said switch to said off state at a second motor voltage higher than said first motor voltage, to compensate for voltage generated by continuing inertia-rotation of said motor following de-energization thereof otherwise delaying actuation setting of said brake, said triggering of said switch to said off state at said second motor voltage enabling faster application of said brake and stopping of said motor.

5. The electric motor brake control circuit according to claim 4 comprising a shiftable reference circuit providing a first reference voltage value upon energization of said motor, and a second reference voltage value upon de-energization of said motor, said switch being triggered to said on state when motor voltage rises above said first motor voltage relative to said first reference voltage value, said switch being triggered to said off state when motor voltage decreases below said second motor voltage relative to said second reference voltage value, said second reference voltage being higher than said first reference voltage.

6. The electric motor brake control circuit according to claim 5 wherein the voltage provided by said reference circuit increases from said first reference voltage value to said second reference voltage value during energization of said motor, and wherein motor voltage rises faster than and reaches a higher level than said second reference voltage value during energization of said motor.

7. The electric motor brake control circuit according to claim 6 wherein the voltage provided by said reference circuit decreases from said second reference voltage value to said first reference voltage value upon de-energization of said motor at a slower rate than the rise from said first reference voltage value to said second reference voltage value upon energization of said motor, and wherein motor voltage decreases at a faster rate than said decrease from said second reference voltage value to said first reference voltage value upon de-energization of said motor.

8. The electric motor brake control circuit according to claim 7 comprising a reset circuit coupled to said reference circuit and responsive to energization of said motor to rapidly shift the voltage of said reference circuit to said first reference voltage value even if the voltage of said reference circuit is still decreasing from said second reference voltage value to said first reference voltage value, to enable substantially instantaneous starting of said motor even if the motor is energized only a short time after de-energization thereof.

9. In an electric motor brake having an electromagnetic brake coil energizable to actuate the brake to a released condition permitting rotation of an electric motor, and de-energizable to enable actuation of the brake setting the brake to a braking condition stopping rotation of the motor, a control circuit comprising a switch having an on state energizing said brake coil, and an off state de-energizing said brake coil, a comparator having an output controlling said switch, and having first and second inputs, a pair of RC charging circuits comprising in combination a fast RC circuit and a slow RC circuit each charged by motor voltage, said fast RC circuit charging faster than said slow RC circuit, said fast RC circuit being coupled to said first input of said comparator, said slow RC circuit being coupled to said second input of said comparator, such that upon energization of said motor, said fast RC circuit charges more rapidly than said slow RC circuit, and said fast RC circuit in turn rapidly charges the voltage at said first input of said comparator above the voltage at said second input of said comparator such that said output of said comparator triggers said switch to said on state to energize said brake coil to actuate said brake to said released condition permitting rotation of said motor, and such that upon de-energization of said motor, said fast RC circuit discharges more rapidly than said slow RC circuit, and in turn said fast RC circuit rapidly discharges the voltage at said first input of said comparator below the voltage at said second input of said comparator, even while said motor is still generating voltage during continued inertia-rotation thereof, the discharging of the voltage at said first input of said comparator below the voltage at said second input of said comparator causing said output of said comparator to trigger said switch to said off state to de-energize said brake coil to enable actuation of said brake to said braking condition stopping further rotation of said motor, without waiting for further decrease voltage generated by said motor.

10. The electric motor brake control circuit according to claim 9 comprising first and second voltage dividers coupled respectively to said fast and slow RC circuits, said first voltage divider limiting the voltage at said first input of said comparator to a first value relative to motor voltage, said second voltage divider limiting the voltage at said second input of said comparator to a second value relative to motor voltage, said second value being less than said first value, such that upon energization of said motor, the voltage at said first input of said comparator rises faster than and reaches a higher level than the voltage at said second input of said comparator, and wherein said first and second values are sufficiently spaced such that during energized running of said motor, the voltage at said first input of said comparator remains above the voltage at said second input of said comparator and does not drop to the latter during normal transient dips in line voltage applied to said motor, and such that upon de-energization of said motor, the voltage at said first input of said comparator drops faster than and crosses below the voltage at said second input of said comparator.

11. The electric motor brake control circuit according to claim 10 comprising in combination a reset circuit coupled to said slow RC circuit and responsive to energization of said motor to rapidly discharge said slow RC circuit in the event there is still voltage stored therein, to enable rapid triggering of said switch to said on state and quick release of said brake upon energization of said motor even if said motor is energized only a short time after de-energization thereof.

12. The electric motor brake control circuit according to claim 11 wherein said reset circuit comprises a second comparator having an output coupled to said slow RC circuit, and having a first input coupled to said fast RC circuit, and having a second input coupled to a pulse charge circuit responsive to motor voltage, such that upon energization of said motor, said pulse charge circuit momentarily charges the voltage at said second input of said second comparator above the voltage at said first input of said second comparator such that said output of said second comparator discharges said slow RC circuit, said pulse charge circuit supplying only a momentary charge to said second input of said second comparator during energization of said motor such that the voltage at said second input of said second comparator at the end of said momentary charge drops below the voltage at said first input of said second comparator, all during energization of said motor, such that said output of said second comparator stops discharging said slow RC circuit, and said slow RC circuit begins charging, to in turn provide increasing voltage at said second input of said first mentioned comparator, such that the rise in voltage at said second input of said first comparator is delayed relative to the rise in voltage at said first input of said first comparator by the length of time which the voltage at said second input of said second comparator is above the voltage at said first input of said second comparator which in turn is controlled by said momentary charge provided by said pulse charge circuit.

13. The electric motor brake control circuit according to claim 12 comprising a diode connected in series between said output of said second comparator and said slow RC circuit, said diode enabling discharging current flow therethrough from said slow RC circuit, and blocking reverse charging current therethrough to said slow RC circuit.

* * * * *

REEXAMINATION CERTIFICATE (4106th)

United States Patent [19]
Chmiel

[11] B1 5,892,341
[45] Certificate Issued Jun. 27, 2000

[54] QUICK SET ELECTRIC MOTOR BRAKE CONTROL

[75] Inventor: Steven F. Chmiel, Cudahy, Wis.

[73] Assignee: Rexnord Corporation, Milwaukee, Wis.

Reexamination Request:
No. 90/005,430, Aug. 9, 1999

Reexamination Certificate for:
Patent No.: 5,892,341
Issued: Apr. 6, 1999
Appl. No.: 08/959,911
Filed: Oct. 29, 1997

[51] Int. Cl.[7] .................................................. H02K 7/10
[52] U.S. Cl. ........................ 318/362; 318/375; 318/757; 318/759; 318/371; 318/372
[58] Field of Search .................................. 318/370, 371, 318/372

[56] References Cited

U.S. PATENT DOCUMENTS

| | | |
|---|---|---|
| 3,590,969 | 7/1971 | Kajitani et al. . |
| 4,417,288 | 11/1983 | Hattori et al. .................... 318/371 X |
| 4,583,916 | 4/1986 | Senghaas et al. .................... 417/36 |
| 4,798,269 | 1/1989 | Lindner et al. . |
| 5,186,287 | 2/1993 | Lindner et al. . |
| 5,278,483 | 1/1994 | Trumpler et al. .................... 318/756 |
| 5,421,436 | 6/1995 | Lindner et al. . |
| 5,620,065 | 4/1997 | Baker et al. . |

FOREIGN PATENT DOCUMENTS

| | | |
|---|---|---|
| 0097237 | 1/1984 | European Pat. Off. . |
| 0242671 | 10/1987 | European Pat. Off. . |
| 0575023 | 12/1993 | European Pat. Off. . |

*Primary Examiner*—Bentsu Ro

[57] ABSTRACT

A control circuit (10) is provided for an electric motor brake (12) having an electromagnetic brake coil (14) energizable to actuate the brake to a released condition permitting rotation of an electric motor (16), and de-energizable to enable actuation of the brake setting the brake to a braking condition stopping rotation of the motor. The control circuit includes a switch (102) having an on state energizing the brake coil, and an off state de-energizing the brake coil. A discriminating trigger circuit (76 et al) responds to voltage across the motor to trigger the switch between its on and off states, and discriminates between increasing and decreasing motor voltage during energization and de-energization, respectively, of the motor, to trigger the switch to its on state at a first motor voltage, and to trigger the switch to its off state at a second motor voltage higher than the first motor voltage, to compensate for voltage generated by continuing inertia-rotation of the motor following de-energization thereof otherwise delaying actuation of the brake. The triggering of the switch to its off state at the second motor voltage enables faster application of the brake and stopping of the motor. The same switch both energizes and de-energizes the brake coil, without a separate relay for de-energizing the brake coil.

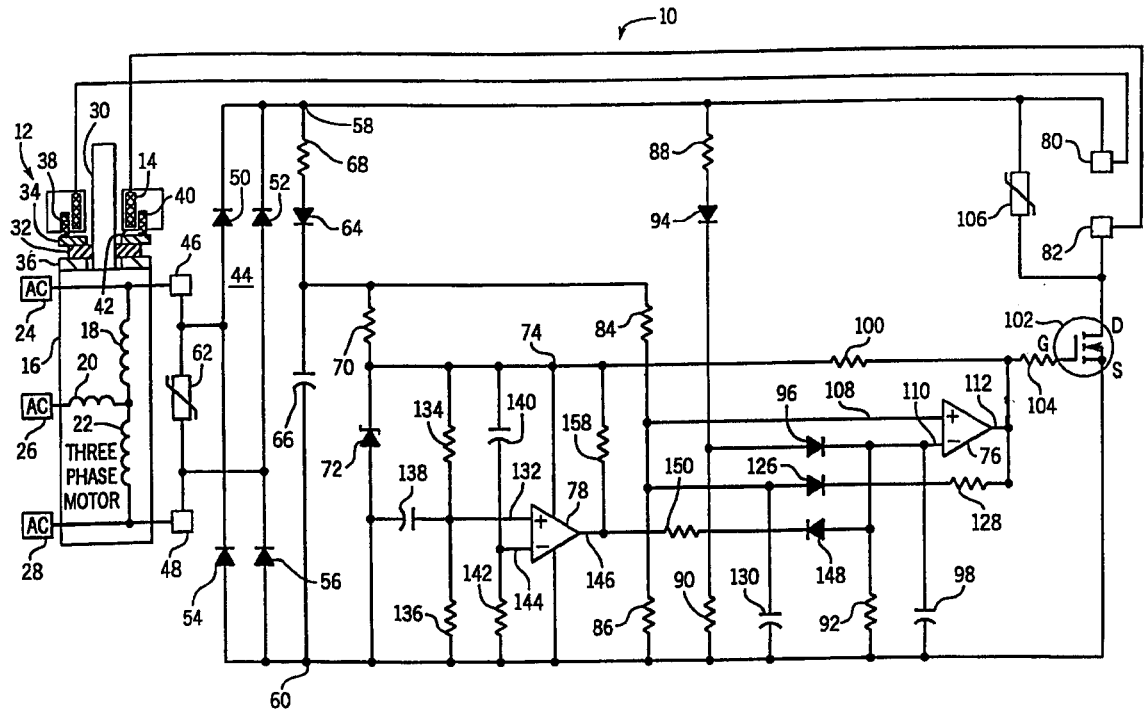

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 4, 9–13 is confirmed.

Claim 1 is cancelled.

Claims 2, 5 are determined to be patentable as amended.

Claims 3, 6–8, dependent on an amended claim, are determined to be patentable.

2. [The electric motor brake control circuit according to claim 1] *In an electric motor brake having an electromagnetic brake coil energizable to actuate the brake to a released condition permitting rotation of an electric motor, and deenergizable to enable actuation of the brake setting the brake to a braking condition stopping rotation of the motor, a control circuit comprising a switch connected in series with said brake coil, the series combination of said switch and said brake coil connected in parallel across said motor, said switch having a conductive on state energizing said brake coil, said switch having a nonconductive off state de-energizing said brake coil, the same said switch both energizing and de-energizing said brake coil without a separate relay for de-energizing said brake coil,* wherein said switch is triggered between said on and off states by motor voltage, said control circuit comprising a discriminating trigger circuit differentially responding to motor voltage during energization and de-energization, respectively, of said motor, to trigger said switch between said on and off states at different motor voltage values during increasing and decreasing motor voltages upon energization and de-energization, respectively, of said motor.

5. The electric brake control circuit according to claim 4 comprising a shiftable reference circuit providing a first reference voltage value upon energization of said motor, and a second reference voltage value upon de-energization of said motor, said switch being triggered to said on state when motor voltage rises above said first motor voltage relative to said first reference voltage value, said switch being triggered to said off state when motor voltage decreases below said second motor voltage relative to said second reference voltage value, said second reference voltage *value* being higher than said first voltage *value*.

* * * * *